US008407590B1

(12) United States Patent
Shamis et al.

(10) Patent No.: US 8,407,590 B1
(45) Date of Patent: Mar. 26, 2013

(54) ON-SCREEN USER-INTERFACE GRAPHIC

(75) Inventors: Zhanna Shamis, San Francisco, CA (US); Bryan Yeung, Waterloo (CA); Derek Jason Phillips, Waterloo (CA); Robert John Kroeger, Ontario (CA); Alex Nicolaou, Waterloo (CA); Shyam Sheth, Mississauga (CA)

(73) Assignee: Google Inc., Mountain View, CA (US)

( * ) Notice: Subject to any disclaimer, the term of this patent is extended or adjusted under 35 U.S.C. 154(b) by 519 days.

(21) Appl. No.: 12/705,452

(22) Filed: Feb. 12, 2010

Related U.S. Application Data

(60) Provisional application No. 61/152,724, filed on Feb. 15, 2009.

(51) Int. Cl.
*G06F 17/00* (2006.01)

(52) U.S. Cl. .......................................... 715/273; 715/787

(58) Field of Classification Search .................. 715/273, 715/786, 787, 864
See application file for complete search history.

(56) References Cited

U.S. PATENT DOCUMENTS

| | | | | |
|---|---|---|---|---|
| 6,956,591 B2 * | 10/2005 | Lundin et al. ................... | 345/684 |
| 6,964,008 B1 | 11/2005 | Van Meter, III ................ | 714/807 |
| 6,965,388 B2 * | 11/2005 | Vale et al. ....................... | 345/660 |
| 7,900,005 B2 | 3/2011 | Kotsovinos et al. ........... | 711/162 |
| 8,010,901 B1 * | 8/2011 | Rogers ............................ | 715/751 |
| 2001/0056370 A1 * | 12/2001 | Tafla ................................ | 705/14 |
| 2002/0042910 A1 | 4/2002 | Baumeister et al. | |
| 2003/0074526 A1 | 4/2003 | Kanamaru et al. ............. | 711/113 |
| 2003/0187957 A1 | 10/2003 | Huang et al. ................... | 709/219 |
| 2004/0049693 A1 | 3/2004 | Douglas .......................... | 713/200 |
| 2004/0250220 A1 * | 12/2004 | Kalenius ......................... | 715/864 |
| 2006/0122883 A1 * | 6/2006 | Lynn ................................ | 705/14 |
| 2007/0011146 A1 * | 1/2007 | Holbrook ......................... | 707/3 |
| 2007/0061410 A1 * | 3/2007 | Alperin ........................... | 709/217 |
| 2007/0263007 A1 | 11/2007 | Robotham et al. | |
| 2007/0271309 A1 | 11/2007 | Witriol et al. .................. | 707/201 |
| 2008/0037721 A1 | 2/2008 | Yao et al. ........................ | 379/88.11 |
| 2008/0184138 A1 * | 7/2008 | Krzanowski et al. .......... | 715/760 |
| 2008/0235594 A1 * | 9/2008 | Bhumkar et al. .............. | 715/738 |
| 2009/0100438 A1 | 4/2009 | Hinton et al. ................... | 719/311 |
| 2010/0031153 A1 | 2/2010 | Ortwein et al. | |
| 2010/0110034 A1 * | 5/2010 | Teng ............................... | 345/173 |
| 2010/0115430 A1 * | 5/2010 | Skirpa ............................. | 715/760 |
| 2010/0199165 A1 * | 8/2010 | Sengamedu ..................... | 715/230 |
| 2010/0199197 A1 * | 8/2010 | Faletski et al. ................. | 715/760 |
| 2010/0223561 A1 * | 9/2010 | Martin et al. ................... | 715/752 |
| 2010/0228737 A1 | 9/2010 | Riemers .......................... | 707/747 |
| 2011/0004524 A1 * | 1/2011 | Paul et al. ....................... | 705/14.58 |
| 2011/0066957 A1 * | 3/2011 | Prats et al. ...................... | 715/753 |
| 2011/0208712 A1 * | 8/2011 | Jones et al. ..................... | 707/706 |
| 2011/0225487 A1 * | 9/2011 | Harris et al. .................... | 715/235 |
| 2011/0261264 A1 * | 10/2011 | Zafarifar et al. ............... | 348/699 |

(Continued)

OTHER PUBLICATIONS

Eng, Improving the Interactivity and Functionality of Web-based Radiology Teaching Files with the Java Programming Language, RadioGraphics 1997, pp. 1567-1574.*

*Primary Examiner* — Cong-Lac Huynh

(74) *Attorney, Agent, or Firm* — Shumaker & Sieffert, P.A.

(57) ABSTRACT

Systems and methods to provide a user-interface graphic are implemented on a client system having one or more processors and memory to store programs. The method includes, while executing a browser application on the client system, displaying a page on a display of the client system; displaying the user-interface graphic over the page at a first position relative to the page. The method further includes receiving a request to scroll the page, responding to the request by scrolling the page, and in response to detecting an end of the scrolling, displaying the user-interface graphic at a second position relative to the page.

20 Claims, 12 Drawing Sheets

U.S. PATENT DOCUMENTS

2011/0302532 A1* 12/2011 Missig .......................... 715/823
2012/0022951 A1* 1/2012 Tolompoiko et al. ...... 705/14.68
2012/0174121 A1* 7/2012 Treat et al. ................... 719/318
2012/0179498 A1* 7/2012 Aharoni et al. .................. 705/5
2012/0254723 A1* 10/2012 Kasa et al. ..................... 715/234
2012/0260158 A1* 10/2012 Steelberg ....................... 715/234

* cited by examiner

```
* position: absolute;          /– 522
* top: -50px;                  /– 524
* right: 1px;                  /– 526
* -webkit-transition: top 0.2s ease-out;  /– 528
```
⟵ 520

Figure 5

```
var widget;                    /– 604
function init(configuration) {
                                           /– 606
var widgetMarkup = widgetTemplate.createMarkup(configuration);
                               /– 608
document.innerHtml += widgetMarkup;
                                           /– 610
widget = document.getElementById('widget');
}
                /– 611
function show() {
widget.style.display = 'block';   /– 612
}
              /– 613
function hide() {
 widget.style.display = 'none';   /– 614
}
              /– 615
function onScroll() {
 var newTop = window.offsetHeight;   /– 616 widget.style.top = (newTop + OFFSET) + "px";   /– 618
}
```
⟵ 600

Figure 6

ON-SCREEN USER-INTERFACE GRAPHIC

RELATED APPLICATIONS

This application claims priority on U.S. Provisional Patent Application 61/152,724, filed on Feb. 15, 2009, which is also incorporated by reference.

TECHNICAL FIELD

The disclosed embodiments generally relate to the field of user interfaces, in particular, to provide a user-interface graphic on a client system.

BACKGROUND

As the desire to maximize the amount of information shown on client systems increases, features to interface with the page or application used to display the information are minimized. Alternatively, the user interface, such as a menu or one or more toolbars, is attached to the top or the bottom of a page or application. Thus, if a user scrolls a page or application to view more information, the user interface is forced off the viewable portion of the screen. This forces a user to scroll back to the position of the user interface to access more features or options of the page or application.

This problem is exacerbated with the use of mobile devices or other client systems having small screens. Because the screens of such devices are typically small, the user interface is typically off screen to maximize the viewing of other information. This forces the user to scroll back to the position of the user interface on the page or the application to access features or functionality.

SUMMARY OF EMBODIMENTS

Systems and methods to provide a user-interface graphic are implemented on a client system having one or more processors and memory to store programs. The method includes, while executing a browser application on the client system, displaying a page on a display of the client system; displaying the user-interface graphic over the page at a first position relative to the page, wherein the first position relative to the page corresponds to a default position relative to the display. The method further includes receiving a request to scroll the page, responding to the request by scrolling the page according to a native scrolling mode of the client system, and in response to detecting an end of the scrolling, updating the position of the user-interface graphic relative to the page such that the user-interface graphic returns to a default position within the display.

Other embodiments and advantages of embodiments will be apparent from the accompanying drawings and from the detailed description that follows.

BRIEF DESCRIPTION OF THE DRAWINGS

For a better understand of the nature and embodiments of the invention, reference should be made to the Description of Embodiments below, in conjunction with the following drawings in which like reference numbers refer to corresponding parts throughout the figures. Embodiments of the present invention are illustrated by way of example and not limitation in the figures.

FIG. 5 is an example of a portion of a style sheet that controls the visual appearance for a user-interface graphic in accordance with some embodiments of the present invention.

FIG. 6 is an example of pseudo-code for a script that updates properties of a user-interface graphic in accordance with some embodiments of the present invention.

DESCRIPTION OF EMBODIMENTS

Figure 1:
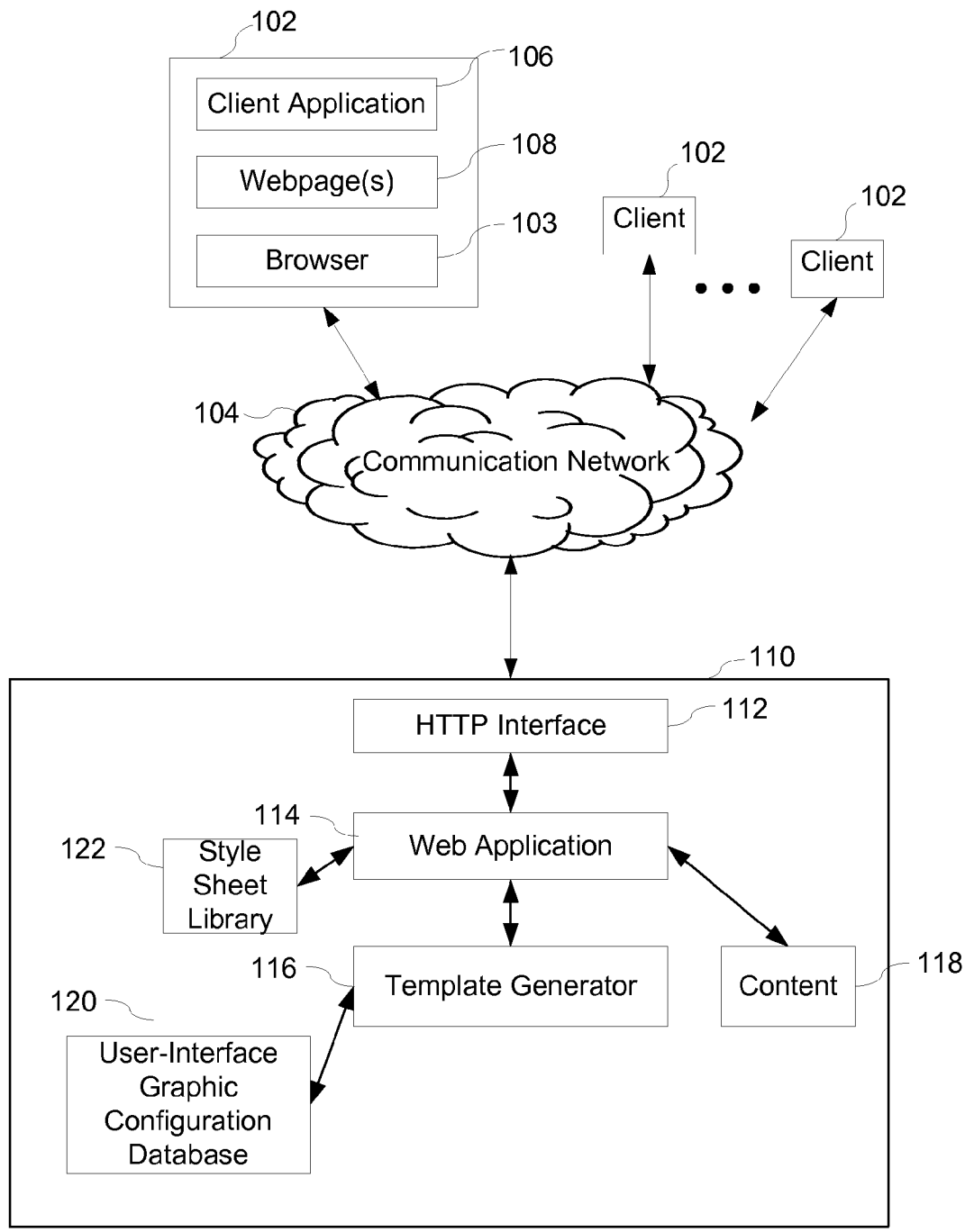
FIG. 1 illustrates a distributed system to generate a user-interface graphic in accordance with some embodiments of the present invention.

Reference will now be made in detail to embodiments, examples of which are illustrated in the accompanying drawings. In the following detailed description, numerous specific details are set forth in order to provide a thorough understanding of the embodiments. However, it will be apparent to one of ordinary skill in the art that the embodiments may be practiced without these specific details. In other instances, well-known methods, procedures, components, and circuits have not been described in detail so as not to unnecessarily obscure aspects of the embodiments.

Embodiments of the present invention are directed to generating a user-interface. Through out this description and the figures the terms user-interface overlay, user-interface graphic, and overlay will be interpreted to have the same meaning and will be used interchangeably. The user-interface graphic provides features for a page, such as a web page or application, to a user of a client device 102 (sometimes called a client system) in the viewable portion of the page. Such a user-interface graphic may provide quick access to commonly used features. Examples of a user-interface graphic include a toolbar, a keyboard, a calendar, a color palette, or other user interface. In some embodiments the user-interface graphic is persistent, staying on the display of a client device 102 full time or substantially full time (e.g., at all times, except when a page is being scrolled). For some other embodiments, the user-interface graphic may be available on request. Since the user-interface graphic is maintained in the viewable portion of the page, a user does not have to scroll to another portion of a page to access certain features. In some embodiments, a user-interface graphic may change in response to a user moving to another portion of a page or changing the context of an application. For such embodiments, the change in the user-interface graphic may provide access to different features than those accessible when other portions of the page are viewed. Examples of different contexts on a page or web application includes, but are not limited to, a message composition context, a message reading context, a conversation viewing context, and a conversation listing context etc.

Creating a user-interface graphic in a viewable portion of a page is particularly useful to a user accessing information or an application when using a client device (e.g., a mobile telephone, personal digital assistant, tablet computer, notebook computer, etc.) in which the display is too small to legibly display an entire page of the information or application. This can result in a user scrolling the page to view a portion of the information or a portion of the application that is outside of the viewable area. The scrolling can be in any direction, such as a horizontal scroll or a vertical scroll. Despite the user scrolling away from menus on the page, through the use of the user-interface graphic a user would still have access to features of the page or application because the user-interface graphic remains in the viewable area despite scrolling. Such a feature is particularly useful for mobile web applications to keep features of the web application accessible without requiring a user to traverse to a specific location on a page, such as the top or bottom, to access certain features of the web application.

FIG. 1 is a diagram illustrating a distributed system to generate a user-interface graphic in accordance with some embodiments of the present invention. One or more computers or client devices 102 (sometimes called "clients" or "client systems") may be connected to a communication network 104. The client device 102 may be any of a number of devices (e.g. a computer, an internet kiosk, a personal digital assistant, a cell phone (sometimes called a mobile telephone), smart phone, video game system, a desktop computer, netbook, digital picture frame, tablet computer, or a laptop computer) and may include one or more browsers 103 and one or more client applications 106.

The browser application 103, such as a web browser (e.g., Firefox, Internet Explorer, Opera or Safari), may permit a user to view one or more webpages 108. The web browser may also permit a user to run one or more applications resident to the client system 102 or web applications 114 that may be accessed through a communication network 104 at server system 110. Examples of web applications 114 include webmail, such as Gmail; online maps, such as Google Maps; online photo albums, such as Picasa; online calendars, such as Google Calendar; office software, such as Google Docs; online retail sales; online auctions, and wikis. For some embodiments, a browser application 103 may be embedded in another client application 106. Such an embedded browser may provide a user of a client application 106 access to web applications, thus enabling functionality in addition to the functionality of the client application 106.

The client application 106 may permit a user to view documents or information. The client application 106 may be a software application that permits a user to interact with the client 102 and/or network resources to perform one or more tasks. For example, the client application 106 may be an application that permits a user to search for, browse, and/or use resources, on the client 102 and/or accessible via the communication network 104. The client application 106 may also include an email application (e.g., Outlook, Lotus Notes, Entourage, or Eudora). Moreover, the client application 106 may include software applications for word processing, to create presentations, and to create spreadsheets. A client application 106 may include software applications that operate to provide functionality to a browser 103.

The communication network 104 may be any local area network (LAN), wireless local area network (WLAN), and/or wide area network (WAN), such as an intranet, an extranet, the Internet or a combination of such networks. It is sufficient that the communication network 104 provides communication capability between the clients 102 and the server system 110. In some embodiments, the communication network 104 uses HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a webpage, a text or word processing document, an email message, a transcribed voice message, a database, an image, or a computational object.

The communication network 104 may be connected to a server system 110. The server system 110 may include an HTTP interface 112, one or more online applications 114, and optionally a template generator 116 and an objects database 120. Server system 110 may be implemented using one or more computers or servers.

The HTTP interface 112 facilitates communication between the communication network 104 and one or more web applications 114. The web applications 114 may be configured to send and receive content 118. The web application 114 may be a webmail application or other type of personalized web application that is utilized in displaying various content 118.

The web applications 114 may also be configured to use a style sheet library 122. For certain embodiments, a style sheet library 122 includes one or more style sheets that correspond to particular content 118. As such, a web application 114 may select a predetermined style sheet from the style sheet library 122 to associate with a particular content 118. The style sheet library 122 may include style sheets using style sheet languages such as Cascading Style Sheets (CSS), Document Style Semantics and Specification Language (DSSSL), Extensible Style sheet Language (XSL), and/or other language used to style webpages. For some embodiments the style sheets may generated dynamically. For example, a style sheet may be dynamically generated for content 118 based on a user profile. The style sheets, for some embodiments, are independent of the webpage content 118 that is sent and received.

The template generator 116 may be accessible to the web application 114. For some embodiments, the template generator 116 obtains objects that define a user-interface graphic. For some embodiments, the objects used to define a user-interface graphic include one or more Javascript objects, Jscript objects, VBScript objects, or objects used by other scripting languages known in the art. In an exemplary embodiment, the objects are Javascript objects. The template generator 116 produces a markup language description (also called a definition) of the user-interface graphic. The template generator 116 may produce markup language using HyperText Markup Language (HTML), Extensible Markup Language (XML), Extensible HyperText Markup Language (XHTML), or another markup language known in the art. For some embodiments HTML version 5 is used. The server system 110 then appends to the markup language used by the web application 114 the markup language that describes the user-interface graphic. For some embodiments, server system 110 retrieves a style sheet from style sheet library 122 that corresponds to generated markup language for the user-interface graphic. The corresponding style sheet is transferred to client system 102 along with the markup language used by web application 114.

Figure 2:
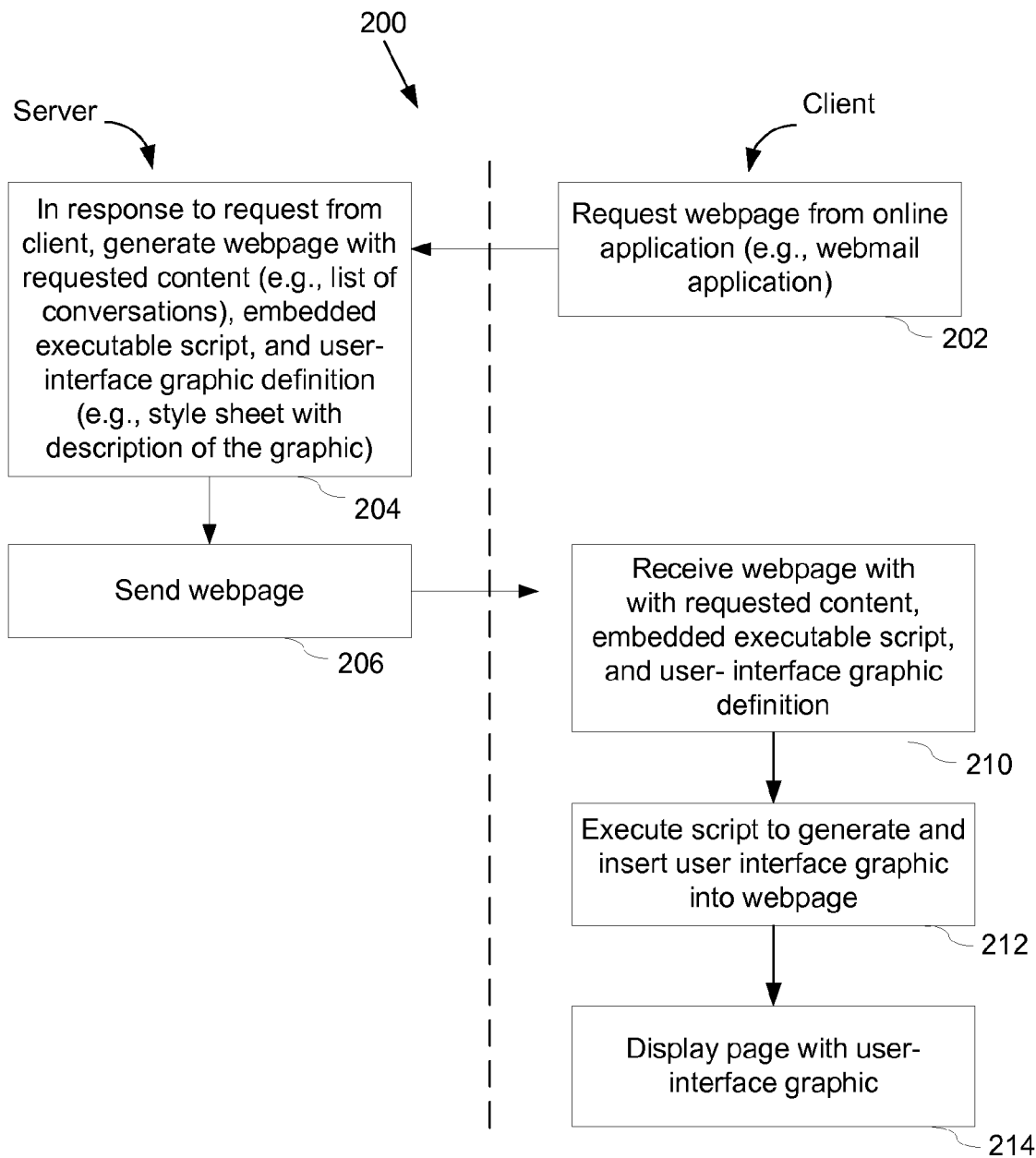
FIG. 2 is a flow diagram illustrating a process to generate a user-interface graphic in accordance with some embodiments of the present invention.

FIG. 2 illustrates a process 200 for generating a webpage with a user-interface graphic in accordance with some embodiments of the present invention. In response to a request 202 from a client device 102 (FIG. 1), requesting a webpage from an online application (e.g., a webmail application or other web application 114), the server system 110 generates 204 a webpage that includes: requested content (e.g., a list of conversations from the user's webmail account), an embedded script for execution by an application (e.g., a browse application) at the client device 102, and a user-interface graphic definition (e.g., a style sheet with descriptions or definitions of one or more user-interface graphics). Optionally, the user-interface graphic definition(s) to be inserted in the webpage may be obtained from a user-graphic configuration database 120 in the server system 110. Alternately, a predefined style sheet associated with the online application may be inserted in the webpage. The server system 110 then sends 206 the webpage to the client device 102. Upon receipt of the webpage 210, a browser application 103 or other client application 106 executing on the client device 102 renders the content in the webpage for display by the client device 102, and executes at least a portion of the script embedded in the webpage so as to insert a user-interface graphic into the displayed webpage 212. The resulting webpage is displayed on the client device 214.

Figure 3:
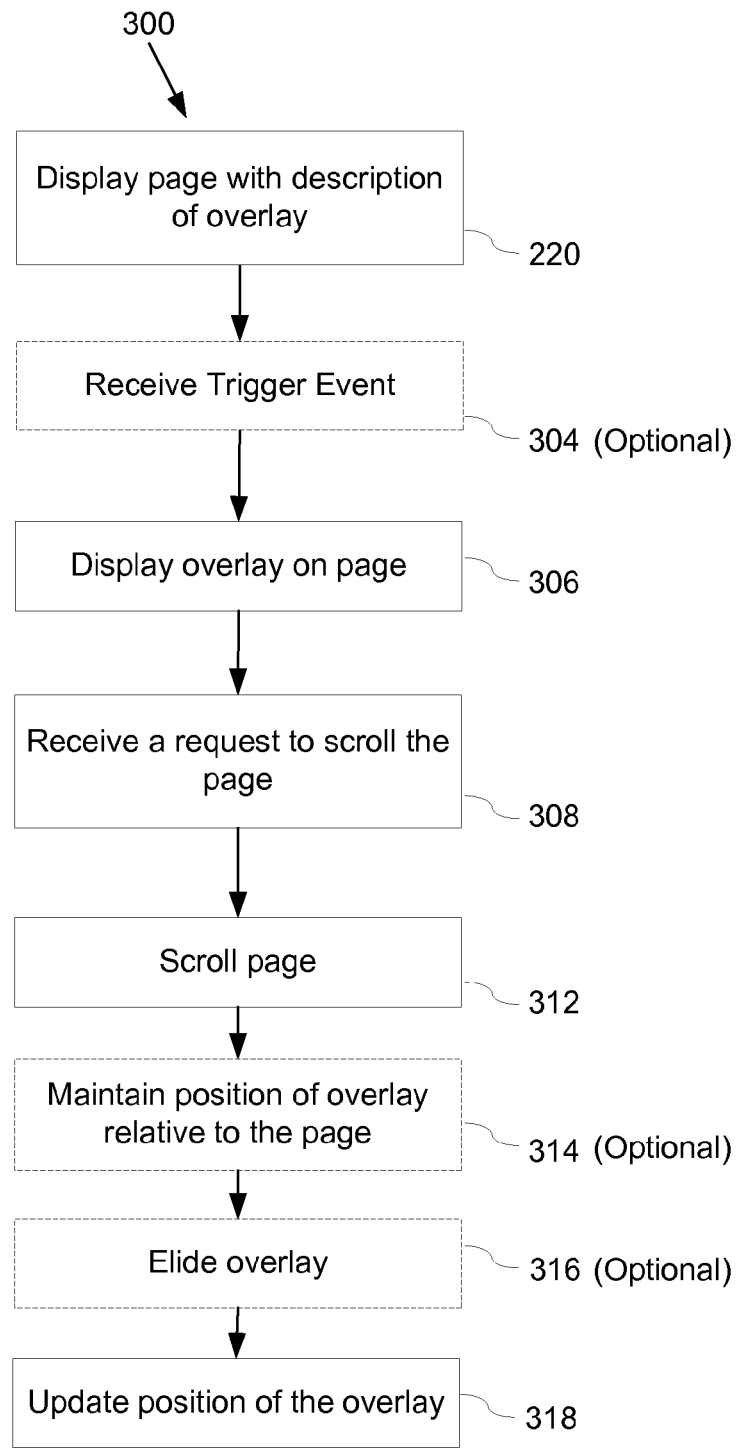
FIG. 3 is a flow diagram illustrating a process to generate a user-interface graphic and to update the position of a user-interface graphic in accordance with some embodiments of the present invention.

FIG. 3 illustrates a process 300 for displaying a webpage or other page having a user-interface graphic, and for updating the position of a user-interface graphic in accordance with some embodiments of the present invention. A client system 102, while executing a browser application 103 or other client application 106, displays a page that includes a user-interface graphic (220). In some embodiments, the user-interface graphic is displayed by the browser application 103 or client application 106 of a client system 102 after a trigger event (304). For example, a trigger event may include user selection of one or more entries in a list of entries displayed on the page.

Other trigger events of interest to the present discussion include one or more of: detection of the start of scrolling of a page, the end of the scrolling of a page, a request for a change in the context of the page or web application, a user-initiated request to view the user-interface graphic, or a period of non-action by the user (e.g., a timeout event). The trigger event may include detection of a user's movement, as sensed through input devices such as a touch-sensitive input device (e.g., a touchpad or touch sensitive display), an accelerometer or other motion detectors. The trigger event, for some embodiments, is native to the client system 102. In other words, a trigger event uses an input model of the client system 102, such as the native scrolling model of the client system 102. An example of a request for a change in the context of a page or a web application 114 includes a user selecting to view a contacts list in a mobile web mail application that currently is view a list of emails. Moreover, an example of a request to view a user-interface graphic may include a user pressing one or more keys of a keyboard of a client system 102, a user touching a touch-sensitive input device, a user selecting a menu option on a page, or another type of input on a client system 102. For some embodiments, instructions (in a scripting language) embedded in the page are executed upon occurrence of a trigger event that is specified in the markup language description of the page. The triggered instructions edit one or more properties of the description of the user-interface graphic in the page.

According to some embodiments, a client system 102 displays the user-interface graphic (306) in accordance with the description included with the page. For some embodiments, the user-interface graphic overlays a portion of the page at a first position relative to the page. Upon receiving a request to scroll the page 308 from the client system, the client device 102 will scroll the page, thereby changing the portion of the page that is displayed by the client device 102. For example, upon receiving a request to scroll the page, the browser application 103 will move the page so that a portion of the page that was not previously viewable in the browser application 103 is now viewable. In some embodiments, the scrolling of the page is performed using a native scrolling mode of the client device, which may be advantageous for achieving smooth scrolling of the page on the display of the client device 102.

In some embodiments, the client system 102 will optionally maintain the position of the user-interface graphic relative to the page (314) as the page scrolls within the browser 103. That is, as the page moves relative to the browser 103, the user-interface graphic will appear to stick to the page and also move with the page relative to the browser 103. For other embodiments, the browser 103 will elide the user-interface graphic (316) as the page scrolls.

After a request to scroll the page (308), the position of the user-interface graphic is updated relative to the page (318). In some embodiments, the repositioning of the user-interface graphic is accomplished by the execution of instructions embedded in the page. Typically, updating the position of the user-interface graphic (318) includes moving the graphic back to a displayed portion of the page. In some embodiments, the position of the graphic is defined by a position parameter in a style sheet associated with the displayed page. For example, the position parameter in the style sheet may be updated to a predefined position within a physical display of the client device 102, or to a predefined position within an application window or browser window. Thus, after the scrolling of the page ends, the user-interface graphic would move back to the predefined position relative to the display or window. For example, the predefined position may be (dx1, dy1) pixels from an origin of the display or browser window. For some embodiments, detecting the end of a scrolling event triggers the user-interface to move the user-interface graphic back to the predefined position. In the above example, if the origin of the display or window is at position (x, y) when the scrolling event end, the user-interface graphic is repositioned to (x+dx1, y+dy1) by the executable instructions embedded in the page.

As discussed above, a trigger event defined in the description of the page, such as scrolling, will result in the execution of embedded instructions contained in the description of the page. The execution of the instructions causes the description of the user-interface graphic in the page to be edited. The editing may change properties and characteristics of the user-interface graphic such as moving the position of the graphic or resulting in the graphic being elided (e.g., until another event terminates the eliding of the graphic).

For some embodiments, editing one or more properties of the user-interface graphic in the page triggers an animation in which the graphic moves from a prior position in the page to a new position in the page. Some embodiments define the type of animation in a style sheet. For example, the style sheet associated with the page may include animation properties to use a Webkit rendering engine or another rendering toolkit to result in a type of animation for the movement of the graphic. Such animation options include linear, ease, ease-in, ease-out, ease-in-out, and cubic bezier.

Figure 4:
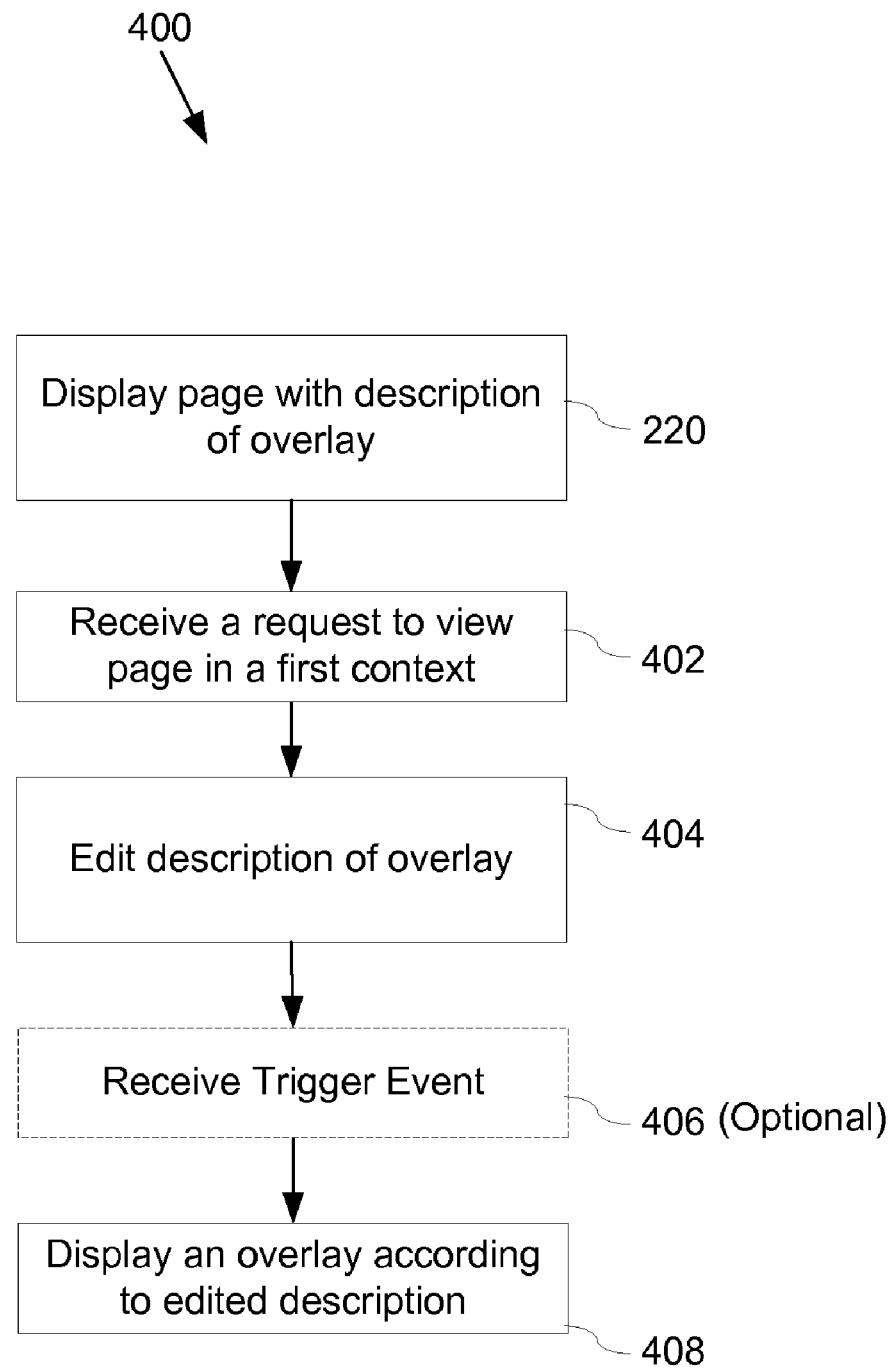
FIG. 4 is a flow diagram illustrating a process to generate different versions of a user-interface graphic block diagram for different contexts of a page in accordance with some embodiments of the present invention.

FIG. 4 illustrates a process 400 to generate different versions of a user-interface graphic block diagram for different contexts of a page, according to some embodiments. After a client system 102 displays a page with a description for one or more user-interface graphics (220), the client system may receive a request from a user to view the page in a first context (402). As discussed above, this may include a user selecting a button to change from conversation list view to a contacts view in a webmail application. According to some embodiments, the description of the one or more user-interface graphics is edited using scripting language contained in the description of the page (404). Once the description of the one or more user-interface graphics is edited, the browser 103 may optionally wait for a trigger event, such as a user selection of an item to display the user-interface graphic in a menu of the browser 103. Moreover, the trigger event could be one of those events described above. For some embodiments, the event that triggers the editing of the description of the graphic is all that is needed to trigger the display of the user-interface graphic according to the edited description (408). For some embodiments, the description of the page includes a plurality of defined properties or characteristics for a plurality of contexts within a page or web application.

FIG. 5 is an example of a portion of a style sheet 520 that controls the visual appearance for a user-interface graphic, according to some embodiments. Setting the position property 522 in a style sheet allows the position of the user-interface graphic to be set directly. The top property 524 controls the position of the top of the user-interface graphic relative to the page in which the style sheet is embedded. The right property 526 fixes the user-interface graphic position on the right side of the page. The -webkit-transition property 528 is used to instruct the browser 103 to animate any changes in the position (or other properties) of the user-interface graphic. For example, as shown in FIG. 5, the -webkit-transition property 528 as defined instructs the browser 103 to animate any changes to the style sheet top property 524 for 0.2 seconds and the "ease-out" controls the rate of the animation over the 0.2 second period. In particular, "ease-out" means that the movement of the graphic starts out quickly and then slows down as it comes to the end of its motion. These properties are by way of example and not limitation. One skilled in the art would understand that many different properties known in the art may be used in a style sheet, as discussed herein, to control the visual appearance of a user-interface graphic.

FIG. 6 is an example of pseudo-code for scripting language 600 that creates and updates properties of a user-interface graphic in accordance with some embodiments of the present invention and in response to a variety of user-events (such as scrolling). The pseudo-code expression "var widgetMarkup=widgetTemplate.createMarkup(configuration)" 606 is used to create the description of a user-interface graphic dynamically based on objects. The pseudo-code expression "document.innerHtml+=widgetMarkup" 608 adds the markup to a page, as discussed above. The pseudo-code expression "widget=document.getElementById('widget')" 610 is used to obtain a scripting language reference, such as a Javascript reference, to the HTML element representing the widget container. Moreover, the pseudo-code expression "function show( )" 611 is called when the conditions are met to show the user-interface graphic, such as a trigger event as discussed above. The pseudo-code expression "widget.style.display='block'" 612 is used to edit the style of a user-interface graphic to make it visible. The pseudo-code expression "function hide( )" 613 is called when the widget should be hidden or elided. The pseudo-code expression "widget.style.display='none'" 614 is used to edit the style of the widget to make it invisible. The pseudo-code expression "function on Scroll( )" 615 is called by the browser event that signifies scrolling has stopped, which is an example of a trigger event discussed above. The var newTop=window.offsetHeight pseudo-code 616 obtains the position of the top of the screen relative to the top of the page and stores that value in a variable called "newTop." Using this information, the pseudo-code expression "widget.style.top=(newTop+OFFSET)+"px"" 618 sets the user-interface graphic to this position, plus a configurable offset, relative to an origin of the page. As discussed above, this kind of editing of the properties of the user-interface graphic triggers an animation of the user-interface graphic, using the speed and manner of animation defined in the style sheet, to move the graphic from a prior position to the newly specified position.

Figure 7:
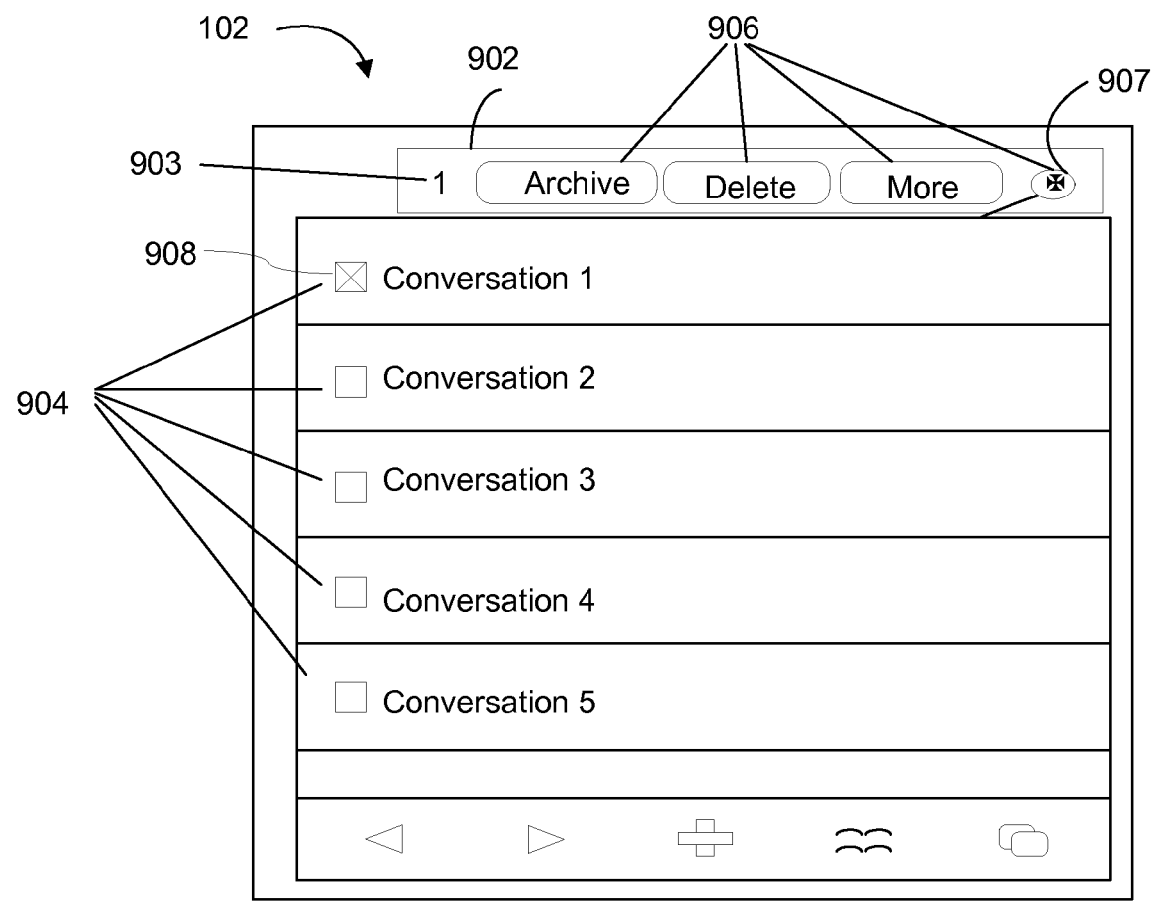
FIG. 7 illustrates an exemplary view of a user-interface graphic for use with a webmail application in a conversation list view on a client system in accordance with some embodiments of the present invention.

FIG. 7 illustrates an exemplary view a user-interface graphic 902 for use with a webmail application in a conversation list view on a client system 102 in accordance to some embodiments of the present invention. The client system 102 displays a list of conversations 904 in a mode or context of the webmail application called the conversation list view. The conversation list 904 includes a list having a plurality of conversations (sometimes called threads). A conversation is defined to mean a set of related messages, where each conversation includes one or more messages, such as email messages, text messages (sometimes called instant messages or IM messages), voicemail messages, video messages, or a combination of such messages. In a typical list of conversations, two or more of the listed conversations will each have two or more messages. In the example shown in FIG. 7, each listed conversation includes a check box 908 for selecting (and/or deselecting) that conversation. In some embodiments, each entry in the list of conversations 904 includes additional information about the respective conversation represented by that entry, such as two or more of the following: a sender list (listing one or more senders of the messages in the conversation), the number of messages in the conversation, a subject of the conversation, a snippet of the conversation, and a date/time of a last message in the conversation.

The user-interface graphic 902 includes functionality buttons 906, each of which executes a function associated with the webmail application when selected or otherwise activated by the user. In the example shown in FIG. 7, the functionality provided to a user through a user-interface graphic 902 includes the ability to archive selected conversations, and the ability to delete selected conversations. In this example, the number of selected conversations is indicated by a numeric indicator 903 in the graphic 902. The value shown by indicator 903 is automatically updated by the executable instructions in the webpage when the user selects additional conversations, deselects conversations, or executes a function or search that changes the number or selected messages. This example also includes a dismiss button 907 to elide the user-interface graphic 902 if the user no longer wants it on the screen. The user-interface graphic 902 also includes a "more"

button to provide a drop down menu that lists additional functions accessible through the user-interface graphic 902. In other embodiments, the user-interface graphic 902 for a webmail application may include a subset of the buttons or features discussed above, and may optionally include additional features.

Figure 8:
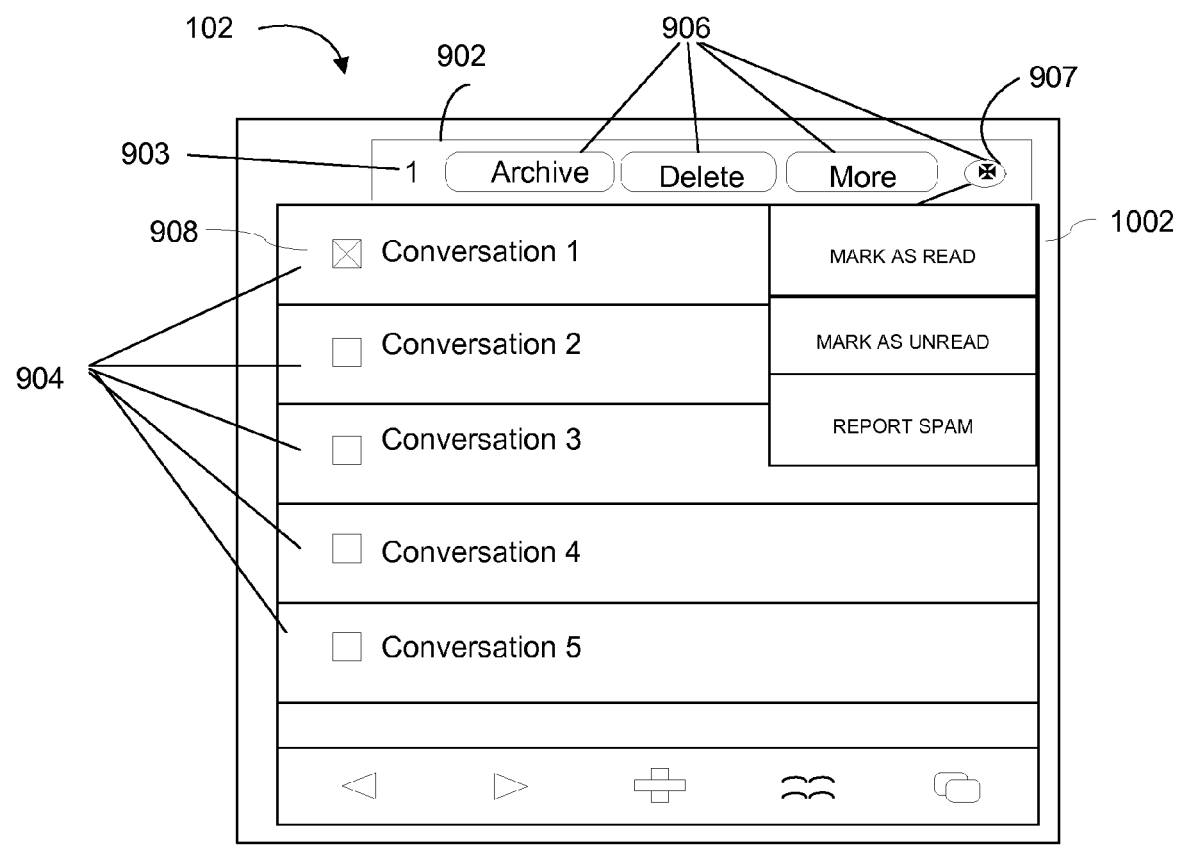
FIG. 8 illustrates an exemplary view of a user-interface graphic with a drop-down menu for use with a webmail application in a conversation list view on a client system in accordance with some embodiments of the present invention.

FIG. 8 illustrates an exemplary view of a user-interface graphic 902 with a drop-down menu for use with a webmail application in a thread-list view on a client system in accordance with some embodiments of the present invention. In addition to FIG. 7, FIG. 8 illustrates the drop down menu 1002 that provides a user with more functionality such as mark as read, mark as unread, and report spam. Similar to that discussed above a user can select a thread in the thread list 904 and use the added functionality offered through the drop down menu 1002 to interact with the web application.

Figure 9:
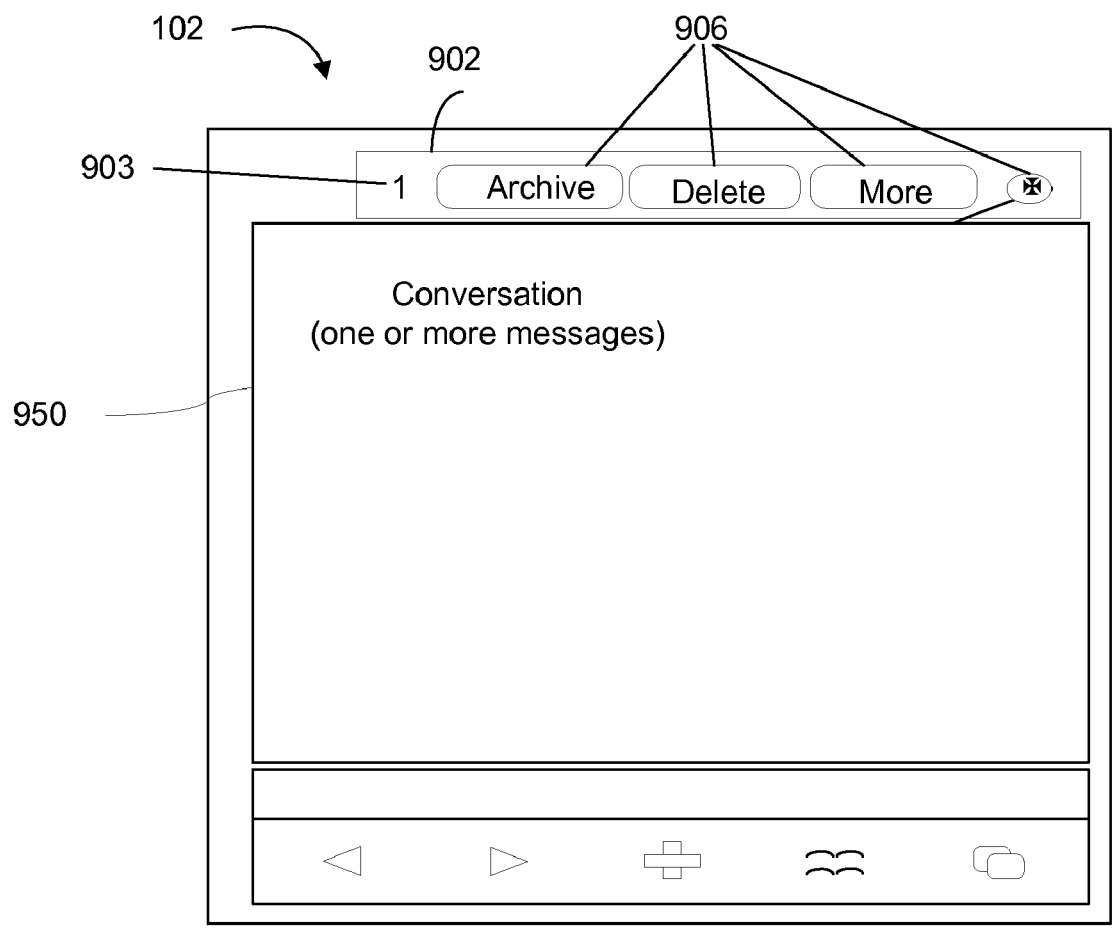
FIG. 9 illustrates an exemplary view of a user-interface graphic for use with a webmail application in a conversation view on a client system in accordance with some embodiments of the present invention.

FIG. 9 illustrates an exemplary view of a user-interface graphic 902 for use with a webmail application in a conversation view on a client system in accordance with some embodiments of the present invention. The conversation view 950 includes a conversation (one or more messages) unlike in the thread list view that displayed a plurality of threads, where each thread includes a plurality of conversations and is represented on a single line.

Figure 10:
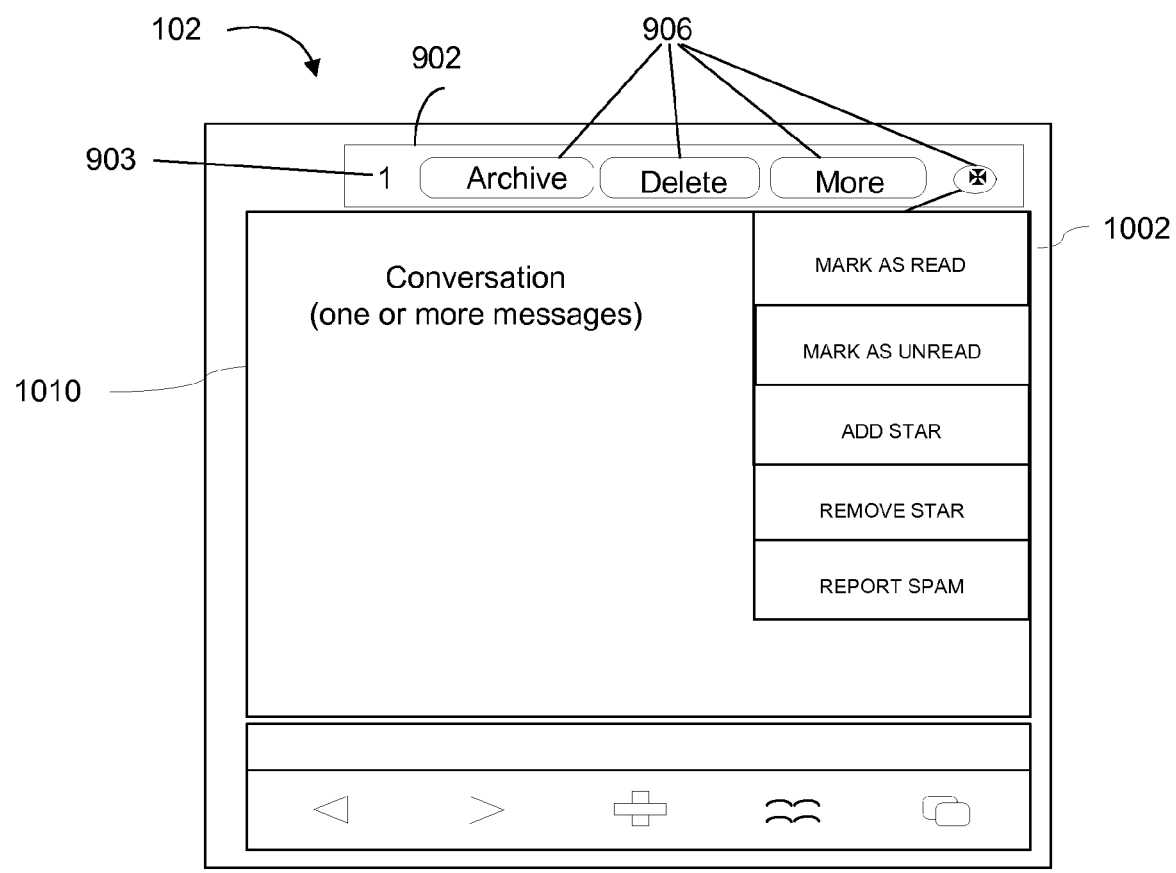
FIG. 10 illustrates an exemplary view of a user-interface graphic with a drop-down menu for use with a webmail application in a conversation view on a client system in accordance with some embodiments of the present invention.

FIG. 10 illustrates an exemplary view of a user-interface graphic 902 with a drop-down menu 1002 for use with a webmail application in a conversation view on a client system in accordance with some embodiments of the present invention. The conversation view 1010 includes a conversation (one or more messages) which is overlaid with a user-interface graphic 902 having a drop down menu 1002. In the context of the conversation view 1010 the drop down menu 1002 adds to the functionality seen in FIG. 9. The additional functions illustrated in the drop down menu are: mark (conversation) as read, mark (conversation) as unread, add star (to conversation), remove star (to conversation), report spam.

Figure 11:
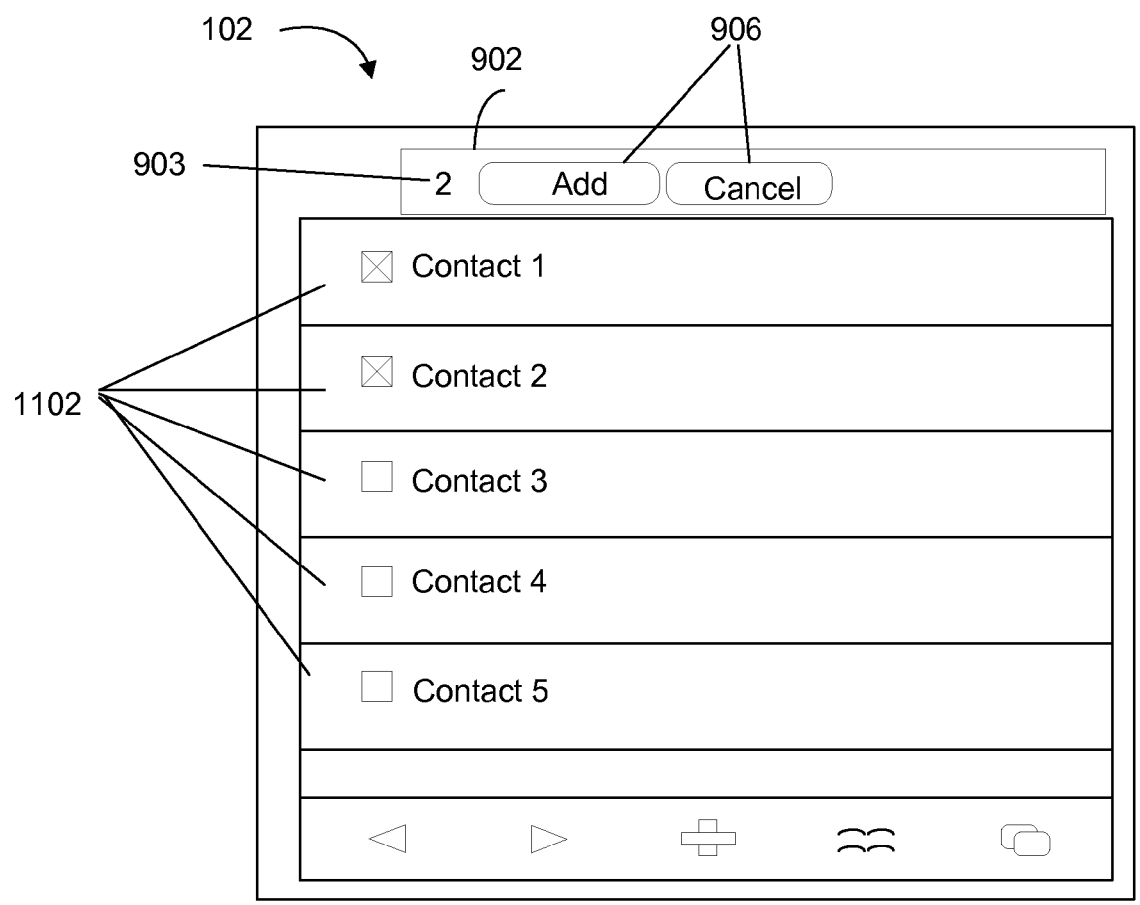
FIG. 11 illustrates an exemplary view of a user-interface graphic for use with a webmail application in a contacts view on a client system in accordance with some embodiments of the present invention.

FIG. 11 illustrates an exemplary view of a user-interface graphic 902; for use with a webmail application in a contacts view or context on a client system in accordance with some embodiments of the present invention. The contacts view, as the example in FIG. 11 illustrates, is a list of contacts 1102 displayed on the display of the client system 103. Moreover, as shown in FIG. 11, the functionality buttons 906 for the contacts view are different from the functionality buttons (e.g., 906, FIG. 9) for the conversation list view and conversation view. The exemplary functionality buttons for the contacts view are: add (i.e., add a contact to the contact list) and cancel (i.e., cancel the operation of adding a contact to the contact list).

Figure 12:
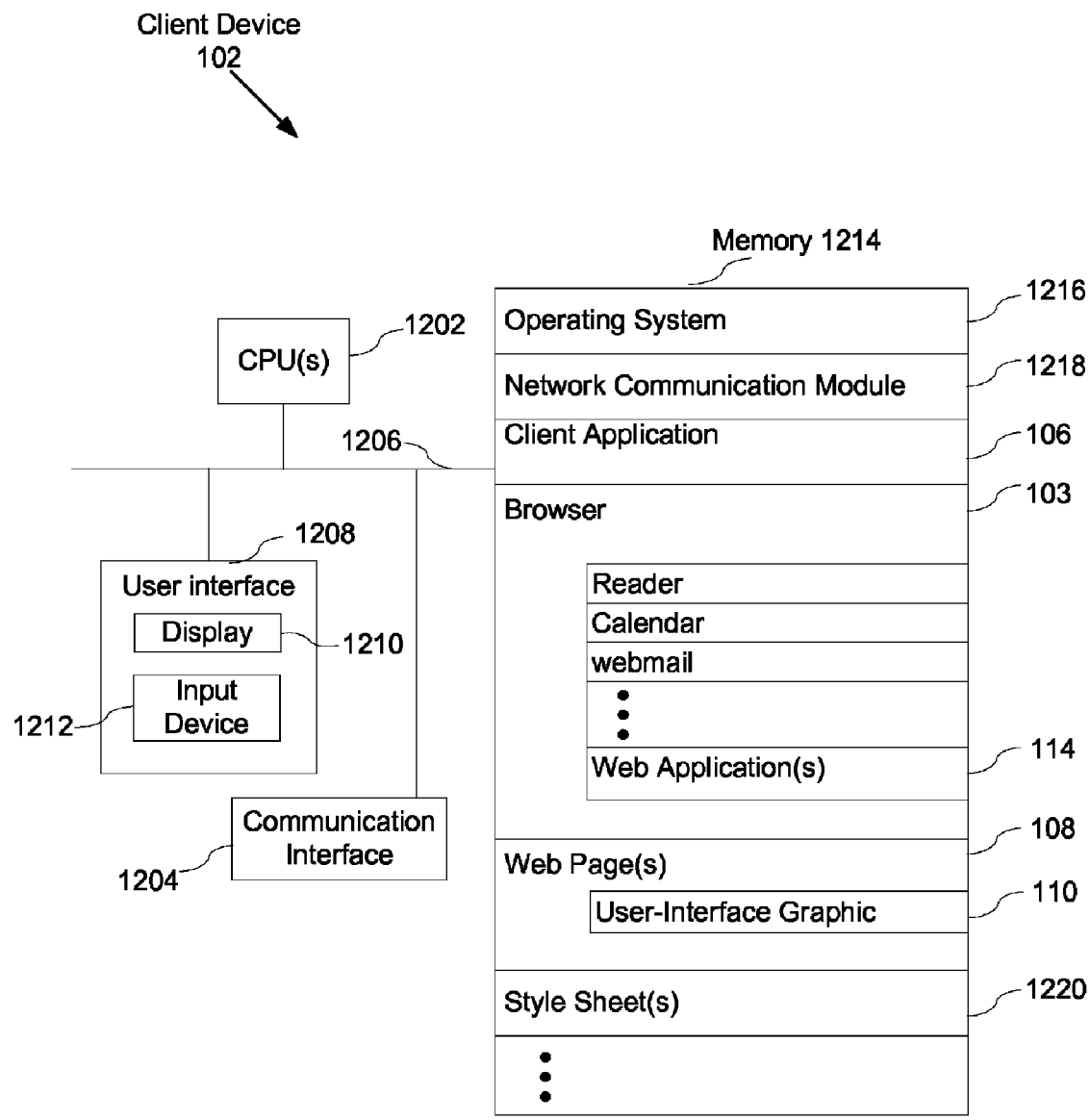
FIG. 12 is a block diagram illustrating an exemplary client system in accordance with some embodiments of the present invention.

FIG. 12 is a block diagram illustrating an exemplary client system 102 in accordance with some embodiments of the present invention. The client system 102 typically includes one or more processors, such as a central processing unit (CPU) 1202, one or more network or other communication interfaces 1204, user interface 1208, memory 1214, and one or more communication buses 1206 for interconnecting these parts. The communication buses 1206 may include circuitry (sometimes called a chipset) that interconnects and controls communications between system components. The user interface 1208 may include a display 1210; an input device 1212, such as a keyboard, track ball, and/or a touch-sensitive input device; and possibly other components as well.

Memory 1214 includes high-speed random access memory, such as DRAM, SRAM, DDR RAM, or other random access solid state memory devices; and may include non-volatile memory, such as one or more magnetic disk storage devices, optical disk storage devices, or other non-volatile solid state storage devices. Memory 1214 may optionally include one or more storage devices remotely located from the CPU(s) 1202. Memory 1214, or alternately the non-volatile memory device(s) within memory 1214, comprises a computer readable storage medium. In some embodiments, memory 1214, or the computer readable storage medium of memory 1214, stores the following programs, modules, and data structures, or a subset thereof:

- an operating system 1216 that includes procedures for handling various basic system services and for performing hardware dependent tasks;
- a network communication module 1218 that is used for connecting the client system 102 to other computers via the one or more communication network interfaces 1204 and one or more communication networks, such as the Internet, other wide area networks, local area networks, metropolitan area networks, and so on;
- a browser application 103 that enables a user to view page(s) including webpage(s) 108 and web applications 114;
- a client application 106 (optional) that enables a user to interact with client 102 and/or network resources to perform one or more tasks, as described above;
- one or more webpages 108 that may be displayed in the display on the browser 103; and
- one or more style sheets 1220.

In some embodiments, the webpages 108 may display a webmail application or other type of web application as discussed above. As described above, the webpages 108 may reference one or more style sheets, or a sequence of style sheets to create and modify a user-interface graphic 110. In some embodiments, the one or more style sheets 1220 may be locally cached for use by the client application 106. In other embodiments, the style sheet(s) 1220 may be downloaded from the server system 110 each time a webpage is downloaded or refreshed.

Figure 13:
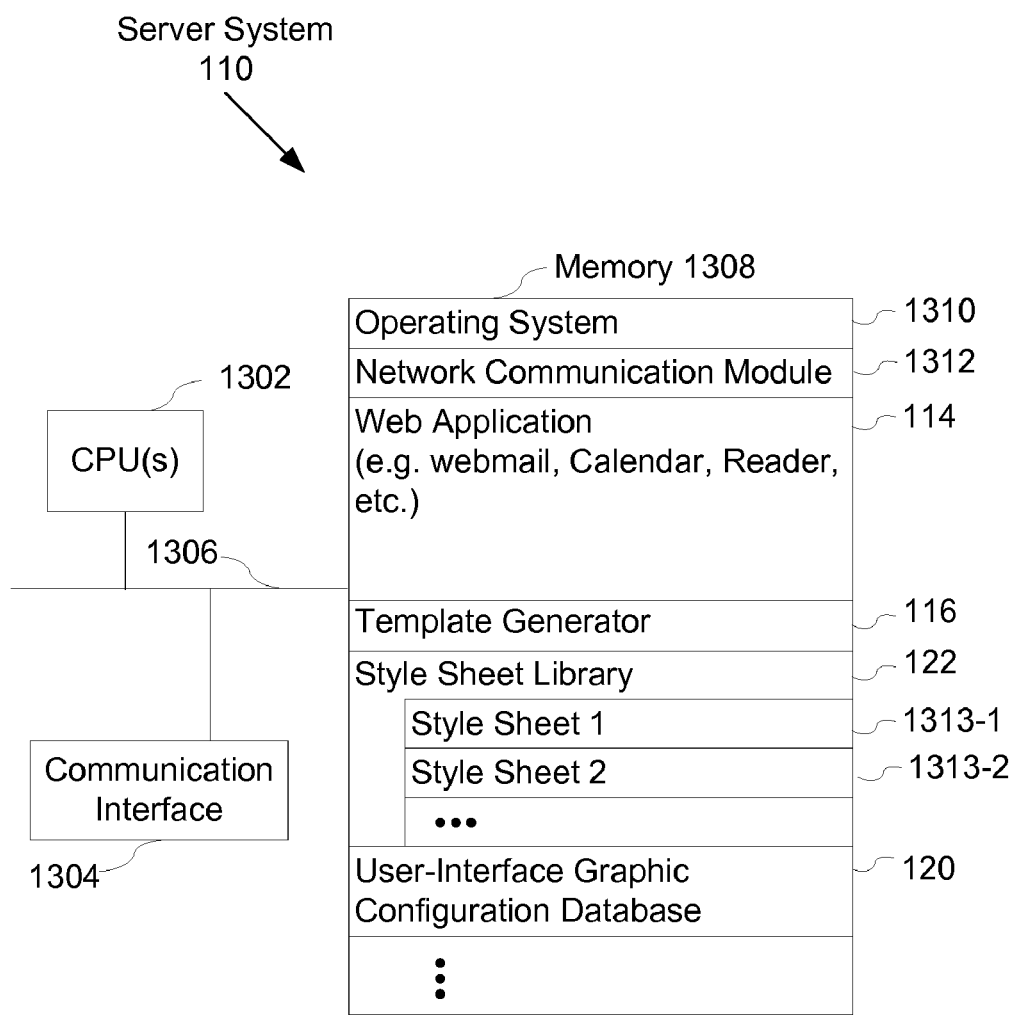
FIG. 13 is a block diagram illustrating an exemplary server system in accordance with some embodiments of the present invention.

FIG. 13 is a block diagram illustrating an exemplary information server 110 in accordance with some embodiments of the present invention. The server system 110 typically includes one or more processors, such as a central processing unit (CPUs) 1302, one or more network or other communication interfaces 1304, memory 1308, and one or more communication buses 1306 for interconnecting these parts. The communication buses 1306 may include circuitry (sometimes called a chipset) that interconnects and controls communications between system components.

Memory 1308 includes high-speed random access memory, such as DRAM, SRAM, DDR RAM, or other random access solid state memory devices; and may include non-volatile memory, such as one or more magnetic disk storage devices, optical disk storage devices, or other non-volatile solid state storage devices. Memory 1308 may optionally include one or more storage devices remotely located from the CPU(s) 1302. Memory 1308, or alternately the non-volatile memory device(s) within memory 1308, comprises a computer readable storage medium. In some embodiments, memory 1308, or the computer readable storage medium of memory 1308, stores the following programs, modules and data structures, or a subset thereof:

- an operating system 1310 that includes procedures for handling various basic system services and for performing hardware dependant tasks;
- a network communication module 1312 that is used for connecting the client system 102 to other computers via the one or more communication network interfaces 1304 and one or more communication networks, such as the Internet, other wide area networks, local area networks, metropolitan area networks, and so on;

a web application 114;

a template generator 116; and a style sheet library 122, including one or more style sheets 1313-1 and 1313-2.

In some embodiments, the web application 114 may be a webmail application or other type of web application.

The style sheet library 122 may store style sheets 1313. The style sheets 1313 may include a main style sheet which may be combined with differential style sheets to produced combined style sheets. Alternately, webpages produced by the web application 114 may reference both a main style sheet and one or more differential style sheets. The various style sheets are utilized to create user-interface graphics as described above.

Each of the above identified elements in FIGS. 12 and 13 may be stored in one or more of the previously mentioned memory devices. The applications, functions, modules and operating systems shown in these Figures correspond to sets of instructions for performing the functions described above. The above identified modules or programs (i.e. set of instructions) need not be implemented as separate software programs, procedures or modules, and thus various subsets of these modules may be combined or otherwise rearranged in various embodiments. In some embodiments, memory 1214 and/or memory 1308 may store a subset of the modules and data structures identified above. Furthermore memory 1214 and/or memory 1308 may store additional modules and data structures not described above.

Although FIGS. 12 and 13 show respectively a client system 102 and a server system 110, the figures are intended more as functional descriptions of the various features which may be present in a client and a set of servers than as a structural schematic of the embodiments described herein. In practice, and as recognized by those of ordinary skill in the art, items shown separately could be combined and some items could be separated. For example, some items shown separately in FIG. 13 could be implemented on a single server and single items could be implemented by one or more servers. The actual number of servers used to implement server system 110 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
   receiving a webpage, the webpage associated with a plurality of contexts;
   receiving a request to view the webpage in a first of the plurality of contexts;
   in response to receiving the request to view the webpage in the first of the plurality of contexts, editing at least one property of the webpage to include a first version of a user-interface graphic and displaying the first version of the user-interface graphic over the webpage at a first position relative to the webpage;
   receiving a request to view the webpage in a second of the plurality of contexts;
   updating the at least one property of the webpage to include a second version of the user-interface graphic on the webpage and displaying the second version of the user-interface graphic on the webpage at the first position relative to the webpage;
   receiving a request to scroll from an input of the client system;
   in response to the request to scroll, scrolling the webpage; and
   in response to detecting an end of the scrolling:
   displaying the second version of the user-interface graphic at a second position relative to the webpage.

2. The method of claim 1, wherein the first position relative to the webpage corresponds to a default position within a display.

3. The method of claim 2, wherein the default position is defined in a style sheet associated with the webpage.

4. The method of claim 1, wherein the scrolling is in accordance to a native scrolling mode of the client system.

5. The method of claim 1, further including, while scrolling the webpage, maintaining the second version of the user-interface graphic at the first position relative to the webpage.

6. The method of claim 1, further including, while scrolling the webpage, eliding the second version of the user-interface graphic.

7. The method of claim 1, further comprising:
   receiving, by the client system, a trigger event native to the client system; and
   in response to the trigger event, displaying, by the client system, the user-interface graphic over the webpage at the first position relative to the webpage.

8. The method of claim 1, wherein displaying the second version of the user-interface graphic over the webpage at the second position relative to the webpage includes animating, by the client system, a movement of the user-interface graphic from the first position relative to the webpage to the second position relative to the webpage.

9. The method of claim 1, wherein the client system is a mobile device.

10. The method of claim 1, further comprising:
    receiving, by the client system, information from a server; and
    creating, by the client system and based at least in part on the information received from the server, the user-interface graphic.

11. The method of claim 1, wherein the user-interface graphic adds functionality to the webpage.

12. The method of claim 1, wherein the webpage has a style sheet and displaying the second version of the user-interface graphic at the second position relative to the webpage comprises updating, by the client system, the style sheet.

13. The method of claim 1, wherein the webpage is associated with an online application having the plurality of contexts, wherein the webpage has a style sheet, and the method further includes:
    in response to receiving the request to view the webpage in the first of the plurality of contexts, setting, by the client system, a predefined group of characteristics in the style sheet so as to generate the first version of the user-interface graphic; and
    in response to receiving the request to view the webpage in the second of the plurality of contexts, setting, by the client system, the predefined group of characteristics in the style sheet so as to generate the second version of the user-interface graphic.

14. The method of claim 1, wherein the user-interface graphic is selected from a group consisting of a toolbar, a calendar, a keyboard and a color palette.

15. The method of claim 1, wherein the webpage includes an on-screen portion and an offscreen portion.

16. The method of claim 1, wherein the webpage includes a style sheet.

17. The method of claim 1, wherein the first position is defined in the style sheet.

18. The method of claim 1, wherein the second position is at a location different than the first position and wherein displaying the second version of the user-interface graphic includes moving, by the client system, the user-interface graphic from the first position relative to the webpage to the second position relative to the webpage in accordance with an animated transition defined in the style sheet.

19. A computer system comprising:
   memory; and
   one or more processors that execute one or more programs stored in the memory, execution of the one or more programs causing the computer system to:
   edit, in response to receiving a request to view a webpage in a first of a plurality of contexts associated with the webpage, at least one property of the webpage such that a first version of a user-interface graphic is displayed over the webpage at a first position relative to the webpage;
   in response to receiving a request to view the webpage in a second of the plurality of contexts associated with the webpage, updated the at least one property of the webpage such that the webpage includes a second version of the user-interface graphic at the first position relative to the webpage;
   in response to receiving a scroll request, scroll the webpage; and
   in response to detecting an end of the scrolling, display the second version of the user-interface graphic over the webpage at a second position relative to the webpage.

20. A computer-readable storage medium storing one or more programs that, when executed by one or more processors of a computer system, cause the computer system to:
   display a webpage within a browser window on a display of the computer system;
   edit, in response to receiving a request to view the webpage in a first of a plurality of contexts associated with the webpage, at least one property of the webpage such that a first version of a user-interface graphic is displayed over the webpage at a first position relative to the webpage;
   in response to receiving a request to view the webpage in a second of the plurality of contexts associated with the webpage, update the at least one property of the webpage such that the webpage includes a second version of the user-interface graphic at the first position relative to the webpage;
   in response to receiving a scroll request, scroll the webpage; and
   in response to detecting an end of the scrolling, display the second version of the user-interface graphic over the webpage at a second position relative to the webpage.

* * * * *